(12) United States Patent
Shimizu

(10) Patent No.: US 11,919,335 B2
(45) Date of Patent: Mar. 5, 2024

(54) PNEUMATIC TIRE

(71) Applicant: BRIDGESTONE CORPORATION, Tokyo (JP)

(72) Inventor: Akiyoshi Shimizu, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 214 days.

(21) Appl. No.: 17/753,749

(22) PCT Filed: Jun. 22, 2020

(86) PCT No.: PCT/JP2020/024398
§ 371 (c)(1),
(2) Date: Mar. 14, 2022

(87) PCT Pub. No.: WO2021/053913
PCT Pub. Date: Mar. 25, 2021

(65) Prior Publication Data
US 2022/0371377 A1    Nov. 24, 2022

(30) Foreign Application Priority Data
Sep. 19, 2019   (JP) .................................. 2019-170671

(51) Int. Cl.
*B60C 11/12*    (2006.01)
*B60C 11/03*    (2006.01)

(52) U.S. Cl.
CPC ...... *B60C 11/0323* (2013.01); *B60C 11/1236* (2013.01); *B60C 11/1281* (2013.01)

(58) Field of Classification Search
CPC ............... B60C 11/1281; B60C 11/032; B60C 11/0323; B60C 11/1218
See application file for complete search history.

(56) References Cited

U.S. PATENT DOCUMENTS 9,878,584 B2    1/2018    Martin et al.
10,369,846 B2   8/2019    Marlier et al.
(Continued)

FOREIGN PATENT DOCUMENTS

CN    104619524 A    5/2015
CN    105960338 A    9/2016
(Continued)

OTHER PUBLICATIONS

JP 2011-105074 Machine Translation; Fujita, Yuji (Year: 2011).*
(Continued)

*Primary Examiner* — Katelyn W Smith
*Assistant Examiner* — Nicholas J Weiler
(74) *Attorney, Agent, or Firm* — KENJA IP LAW PC

(57) ABSTRACT

A pneumatic tire of the present disclosure includes, on a tread surface, a plurality of circumferential main grooves extending in the tire circumferential direction, and a plurality of land portions defined between circumferential main grooves adjacent in the tire width direction among the plurality of circumferential main grooves or by the circumferential main grooves and tread edges. The land portions include at least one circumferential sipe extending in the tire circumferential direction. The circumferential sipe includes a plurality of widened portions arranged in the tire circumferential direction. In a reference state, each widened portion is formed only from a portion that, from one side towards the other side in the tire circumferential direction, extends from the tread surface inward in the tire radial direction.

20 Claims, 2 Drawing Sheets

(56) References Cited

U.S. PATENT DOCUMENTS

| | | |
|---|---|---|
| 10,850,570 B2 | 12/2020 | Hiroshi |
| 2002/0189734 A1 | 12/2002 | Ishiyama |
| 2011/0277898 A1 | 11/2011 | Barraud et al. |
| 2012/0227883 A1 | 9/2012 | Audigier et al. |
| 2015/0041034 A1* | 2/2015 | Matsushita ......... B60C 11/0304 152/209.24 |
| 2015/0273950 A1 | 10/2015 | Martin et al. |
| 2019/0248189 A1 | 8/2019 | Vautard et al. |
| 2020/0298625 A1 | 9/2020 | Zhu et al. |
| 2021/0178829 A1 | 6/2021 | Zivkovic et al. |

FOREIGN PATENT DOCUMENTS

| | | | |
|---|---|---|---|
| EP | 3381718 A1 | 10/2018 | |
| EP | 3446893 A1 | 2/2019 | |
| JP | S62241708 A | 10/1987 | |
| JP | S62241712 A | 10/1987 | |
| JP | 102303908 A | 12/1990 | |
| JP | H11189015 A | 7/1999 | |
| JP | 2002225512 A | 8/2002 | |
| JP | 2005007958 A | 1/2005 | |
| JP | 2006168462 A | 6/2006 | |
| JP | 2006281689 A | 10/2006 | |
| JP | 2009098981 A | 5/2009 | |
| JP | 2011105074 A | * | 6/2011 |
| JP | 2012076660 A | | 4/2012 |
| JP | 2012513328 A | | 6/2012 |
| JP | 2013505874 A | | 2/2013 |
| JP | 2017094891 A | | 6/2017 |
| JP | 2019510681 A | | 4/2019 |
| WO | 2017103452 A1 | | 6/2017 |
| WO | 2019092364 A1 | | 5/2019 |
| WO | 2020096745 A1 | | 5/2020 |

OTHER PUBLICATIONS

JP 2012-076660 Machine Translation; Miyoshi, Masaaki (Year: 2012).*

Jan. 18, 2023, search result of Office Action issued by the China National Intellectual Property Administration in the corresponding Chinese Patent Application No. 202080059942.0.

Jan. 3, 2023, search result of the Extended European Search Report issued by the European Patent Office in the corresponding European Patent Application No. 20864535.8.

Mar. 15, 2022, International Preliminary Report on Patentability issued in the International Patent Application No. PCT/JP2020/024398.

Aug. 25, 2020, International Search Report issued in the International Patent Application No. PCT/JP2020/024398.

* cited by examiner

PNEUMATIC TIRE

TECHNICAL FIELD

The present disclosure relates to a pneumatic tire.

BACKGROUND

As technology for improving the drainage performance of a tire during progression of wear, it has been proposed to provide grooves or sipes, in the tread surface of the tire, whose groove width increases when wear progresses. For example, see Patent Literature (PTL) 1.

CITATION LIST

Patent Literature

PTL 1: JP 2013-505874 A

SUMMARY

Technical Problem

In pneumatic tires with grooves and sipes as described above, the appearance of widened portions during wear may cause rapid changes in tire performance.

The present disclosure aims to provide a pneumatic tire capable of ensuring drainage performance when wear progresses while suppressing abrupt changes in tire performance when wear progresses.

Solution to Problem

A summary of the present disclosure is as follows.
(1) A pneumatic tire of the present disclosure is a pneumatic tire including, on a tread surface, a plurality of circumferential main grooves extending in a tire circumferential direction, and a plurality of land portions defined between circumferential main grooves adjacent in a tire width direction among the plurality of circumferential main grooves or by the circumferential main grooves and tread edges, wherein
the land portions include at least one circumferential sipe extending in the tire circumferential direction,
the circumferential sipe includes a plurality of widened portions, having a sipe width larger than in other portions, arranged in the tire circumferential direction, and
in a reference state such that the pneumatic tire is mounted on an applicable rim, filled to a prescribed internal pressure, and under no load,
each widened portion is formed only from a portion that, from one side towards another side in the tire circumferential direction, extends from the tread surface inward in a tire radial direction.

Here, the "tread surface" refers to the entire tread surface in the tire circumferential direction that comes into contact with the road surface when the pneumatic tire is mounted on an applicable rim, filled to a prescribed internal pressure, and subjected to the maximum load.

The "circumferential main groove" refers to a groove extending in the tire circumferential direction and having an opening width of 2 mm or more at the aforementioned tread surface when the pneumatic tire is mounted on an applicable rim, filled to a prescribed internal pressure, and under no load.

The "tread edges" refer to the outermost points of the aforementioned tread surface on both sides in the tire width direction.

The "circumferential sipe" refers to a sipe extending in the tire width direction and having an opening width of less than 2 mm at the aforementioned tread surface when the pneumatic tire is mounted on an applicable rim, filled to a prescribed internal pressure, and under no load.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "prescribed internal pressure" refers to the air pressure (maximum air pressure) corresponding to the maximum load capability prescribed for each vehicle on which the tire is mounted.

The "maximum load" refers to the load corresponding to the aforementioned maximum load capability.

In the present description, the "average inclination angle" refers to the inclination angle, relative to the normal direction of the tread surface, of a straight line passing through the tire radial outer and inner edges of the sipe bottom area of the widened portion in a tire circumferential cross-sectional view in the reference state.

Advantageous Effect

According to the present disclosure, a pneumatic tire capable of ensuring drainage performance when wear progresses while suppressing abrupt changes in tire performance when wear progresses can be provided.

DETAILED DESCRIPTION

Embodiments of the present disclosure are described below in detail with reference to the drawings.

The internal structure and the like of the pneumatic tire (hereinafter referred to simply as the tire) can be the same as those of conventional tires. As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to the prescribed internal pressure, and under no load.

Figure 1:
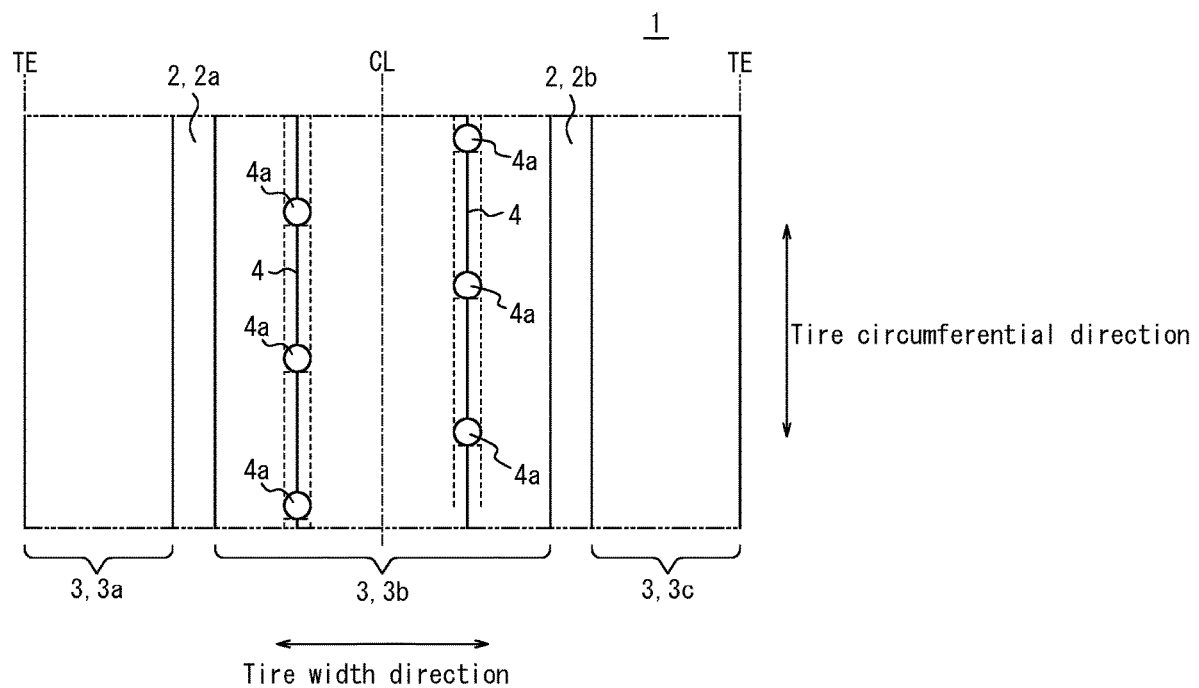
FIG. 1 is a developed view schematically illustrating a tread pattern of a pneumatic tire according to an embodiment of the present disclosure.

FIG. 1 is a developed view schematically illustrating a tread pattern of a pneumatic tire according to an embodiment of the present disclosure.

As illustrated in FIG. 1, a tire of the present example includes, on a tread surface 1, a plurality (two in the illustrated example) of circumferential main grooves 2 (2a, 2b) extending in the tire circumferential direction, and a plurality (three in the illustrated example) of land portions 3 (3a, 3b, 3c) defined between circumferential main grooves 2 adjacent in the tire width direction among the plurality of circumferential main grooves 2 or by the circumferential main grooves (2a, 2b) and the tread edges TE. In the present example, the circumferential main groove 2a is positioned in a half portion on one side, in the tire width direction, bordered by the tire equatorial plane CL, and the other circumferential main groove 2b is positioned in a half portion on the other side, in the tire width direction, bordered by the tire equatorial plane CL. In the present example, one land portion 3 (3b) is positioned on the tire equatorial plane CL, and one land portion 3 (3a, 3c) is positioned in each tire widthwise half. In the example illustrated in FIG. 1, the number of circumferential main grooves 2 is two, but the number can be one, or can be three or more. Accordingly, the number of land portions 3 can also be two, or can be four or more.

The land portion 3b includes at least one (two in the illustrated example) circumferential sipe 4 extending in the tire circumferential direction. In the present example, the land portion 3b includes the circumferential sipe 4, but it suffices for any land portion 3 to include the circumferential sipe. In the present example, all of the land portions 3 are rib-like land portions having no widthwise grooves (in the present specification, a land portion 3 divided in the tire circumferential direction by a widthwise sipe 4 is still considered to be a rib-like land portion as long as the land portion 3 is not completely divided by a widthwise groove). One or more land portions 3 can, however, be block-shaped land portions.

Here, the groove width (opening width (opening width measured perpendicular to the extending direction of the groove in plan view)) of the circumferential main groove 2 is not particularly limited, since the groove width also depends on the number of circumferential main grooves 2, but can, for example, be between 5 mm and 25 mm. Similarly, the groove depth (maximum depth) of the circumferential main groove 2 is not particularly limited, but can, for example, be between 6 mm and 18 mm.

In the illustrated example, the circumferential main grooves 2 all extend along the tire circumferential direction (without inclination) in plan view of the tread surface 1, but at least one of the circumferential main grooves 2 may extend at an inclination relative to the tire circumferential direction. In this case, the circumferential main groove 2 may be inclined at an angle of, for example, 5° or less relative to the tire circumferential direction. In the illustrated example, all of the circumferential main grooves 2 extend straight in the tire circumferential direction, but at least one of the circumferential main grooves 2 may have a shape such as a zigzag shape or a curved shape.

Here, the sipe width (opening width (opening width measured perpendicular to the extending direction of the groove in plan view)) of the circumferential sipe 4 is not particularly limited, since the sipe width also depends on the number of circumferential sipes 4, but can, for example, be between 0.2 mm and 1.0 mm (excluding the locations of widened portions 4a). Similarly, the sipe depth (maximum depth) of the circumferential sipe 4 is not particularly limited, but can, for example, be between 4.0 mm and 18.0 mm.

In the illustrated example, all of the circumferential sipes 4 extend along the tire circumferential direction (without inclination), but one or more circumferential sipes 4 may extend at an inclination relative to the tire circumferential direction. In this case, the circumferential sipes 4 are preferably inclined relative to the tire circumferential direction at an inclination angle of 5° or less. The circumferential sipes 4 extend continuously along the circumference of the tire in the illustrated example but may include a discontinuous portion.

Figure 2:
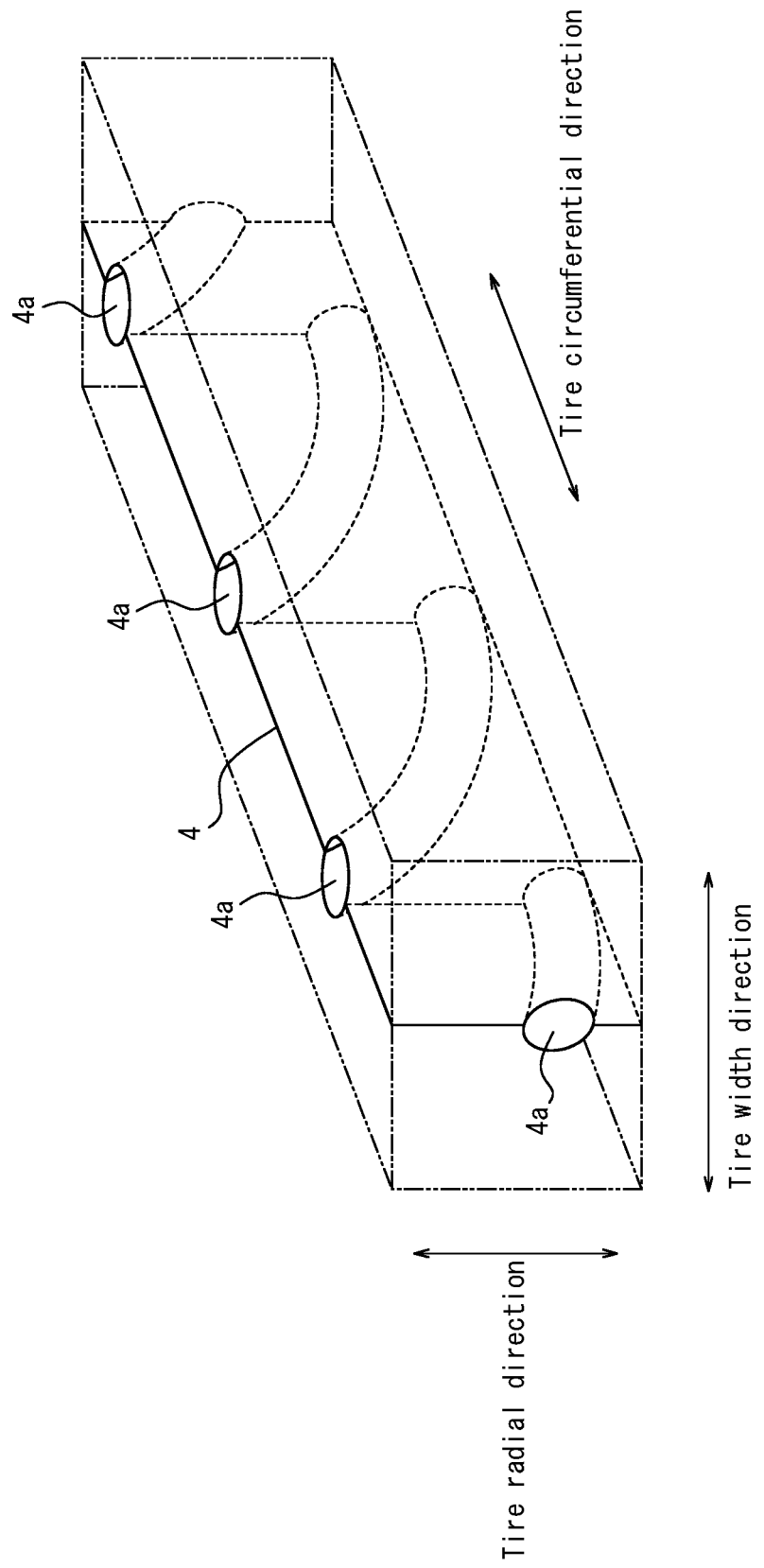
FIG. 2 is a partial perspective view of a circumferential sipe.

FIG. 2 is a partial perspective view of a circumferential sipe.

As illustrated in FIGS. 1 and 2, in the present embodiment, the circumferential sipe 4 includes a plurality of widened portions 4a, having a sipe width larger than in other portions, arranged in the tire circumferential direction. As illustrated in FIG. 2, in a reference state such that the pneumatic tire is mounted on an applicable rim, filled to a prescribed internal pressure, and under no load, each widened portion 4a is formed only from a portion that, from one side towards the other side in the tire circumferential direction, extends from the tread surface 1 (the upper side of the drawing) inward in the tire radial direction (towards the bottom side of the drawing).

As illustrated in FIG. 2, in the reference state, each widened portion 4a includes a portion in which the inclination angle relative to the normal direction of the tread surface 1 increases from the outside to the inside in the tire radial direction. In the illustrated example, all (the entirety) of the widened portion 4a has an inclination angle that gradually increases relative to the normal direction of the tread surface 1 from the outside to the inside in the tire radial direction. In the illustrated example, the widened portion 4a has a constant sipe width from the outside to the inside in the tire radial direction. The maximum diameter of the widened portion 4a is not particularly limited but can be 1.5 to 2 times the sipe width of other portions. The widened portion 4a has a curved cylindrical shape, and when viewed from the tread surface 1 side, is substantially circular in plan view, but in a transparent plan view, the widened portion 4a adopts a (substantially elliptical) shape whose ellipticity increases with increased sipe depth, and whose area increases.

The effects of the pneumatic tire according to the present embodiment are described below.

According to the pneumatic tire of the present embodiment, first, the drainage performance can be improved, since one or more circumferential sipes 4 are provided in the land portions 3.

Furthermore, the circumferential sipe 4 includes the plurality of widened portions 4a, having a sipe width larger than in other portions, arranged in the tire circumferential direction. Therefore, the drainage performance in particular can be improved as compared to the case of the widened portion not being included.

Here, in the reference state, each widened portion 4a is formed only from a portion that, from one side towards the other side in the tire circumferential direction, extends from the tread surface 1 inward in the tire radial direction. As a result, the widened portion 4a appears continuously with the progression of wear, and the position of the widened portion 4a in the tire circumferential direction moves continuously to the other side in the tire circumferential direction with the progression of wear. As compared to the case of the shape of the widened portion being such that the position of the widened portion 4a moves in an unconnected manner, a sudden change in tire properties (such as wear resistance) when wear progresses can therefore be suppressed.

As described above, the pneumatic tire of the present embodiment is capable of ensuring drainage performance when wear progresses while suppressing abrupt changes in tire performance when wear progresses.

Here, as in the present embodiment, the widened portion preferably includes a portion in which the inclination angle relative to the normal direction of the tread surface increases from the outside to the inside in the tire radial direction. The reason is that when wear progresses, the groove volume decreases, whereas the area of the widened portion increases, enabling effective suppression of a decrease in drainage performance.

As in the illustrated example, all (the entirety) of the widened portion may have an inclination angle that increases relative to the normal direction of the tread surface from the outside to the inside in the tire radial direction. In this case, all (the entirety) of the widened portion can have an inclination angle that gradually increases relative to the normal direction of the tread surface 1 from the outside to the inside in the tire radial direction. This can achieve the aforementioned effect of effectively suppressing a decrease in drainage performance across the entire area in the tire radial direction. Alternatively, a portion of the widened portion may have an inclination angle that increases relative to the normal direction of the tread surface 1 from the outside to the inside in the tire radial direction. In this case, in the reference state, the tire radial area from the sipe bottom of the circumferential sipe to ⅓ of the sipe depth of the circumferential sipe is designated as a sipe bottom area, and in at least a portion (preferably the entirety) of the sipe bottom area, the inclination angle of the widened portion preferably increases (for example, gradually increases) relative to the normal direction of the tread surface 1 from the outside to the inside in the tire radial direction. The reason is that a decrease in drainage performance can more effectively be suppressed, since the groove volume greatly decreases at the end of wear, when the sipe bottom area becomes the contact patch. In this case, the area other than the sipe bottom area can, for example, have a non-curved cylindrical shape.

The widened portion preferably includes a portion in which the sipe width increases from the outside to the inside in the tire radial direction. The reason is that when wear progresses, the groove volume decreases, whereas the area of the widened portion increases with this configuration as well, enabling effective suppression of a decrease in drainage performance.

In this case, all (the entirety) of the widened portion may have a sipe width that increases from the outside to the inside in the tire radial direction. In this case, all (the entirety) of the widened portion can have a sipe width that gradually increases from the outside to the inside in the tire radial direction. This can achieve the aforementioned effect of effectively suppressing a decrease in drainage performance across the entire area in the tire radial direction. Alternatively, a portion of the widened portion may have a sipe width that increases from the outside to the inside in the tire radial direction. In this case, in at least a portion (preferably the entirety) of the sipe bottom area, the widened portion preferably has a sipe width that increases (for example, gradually increases) from the outside to the inside in the tire radial direction. The reason is that a decrease in drainage performance can more effectively be suppressed, since the groove volume greatly decreases at the end of wear, when the sipe bottom area becomes the contact patch. In this case, the sipe width can be made constant in areas other than the sipe bottom area.

As illustrated in FIG. 2, when viewed as projected in the tire radial direction, only one widened portion 4a preferably exists, without the plurality of widened portions 4a overlapping each other. The reason is that by the number of widened portions 5a visible in the tire radial direction not changing depending on the position in the tire circumferential direction, the balance of rigidity in the tire circumferential direction can be optimized. However, the plurality of widened portions 4a may overlap each other when viewed as projected in the tire radial direction.

The circumferential sipe of the present disclosure may be applied to a circumferential sipe at any position. However, the circumferential sipe having the widened portions is preferably provided at least in a center land portion. In a case in which a circumferential main groove is located on the tire equatorial plane, the two land portions defined by this circumferential main groove located on the tire equatorial plane are designated as center land portions, and in a case in which a land portion is located on the tire equatorial plane, this land portion is designated as the center land portion. A particularly high drainage performance is desirable for the center land portion, and the drainage performance when wear progresses can effectively be improved in this way.

In the reference state, the average inclination angle of the widened portion relative to the normal direction of the tread surface at the sipe bottom area in the center land portion is preferably larger than an average inclination angle of the widened portion relative to the normal direction of the tread surface in intermediate land portions. A particularly high drainage performance is desirable for the center land portion, and the drainage performance when wear progresses can effectively be improved in this way.

In the reference state, the sipe width of the widened portion at the sipe bottom area in the center land portion is preferably larger than the sipe width of the widened portion at the sipe bottom area in intermediate land portions. A particularly high drainage performance is desirable for the center land portion, and the drainage performance when wear progresses can effectively be improved in this way.

By use of one side in the tire circumferential direction as the stepping-in side, the water absorption by the widened portions improves, thereby further improving the drainage performance.

In the case in which the tire rotation direction is specified, for example, the one side in the tire circumferential direction is preferably the stepping-in side for this reason.

One land portion preferably includes a plurality of the circumferential sipes, the widened portions of two circumferential sipes adjacent in the tire width direction are preferably provided at positions shifted from each other in the tire circumferential direction when the tread surface is viewed while the pneumatic tire is new, and the widened portions of the plurality of circumferential sipes are preferably identical to each other in shape.

Since the widened portions that are adjacent to each other in the tire width direction when the tire is new are shifted from each other in the tire circumferential direction (i.e., staggered), the drainage performance can be further improved, and the balance of rigidity of land portions can be optimized. Furthermore, the widened portions have an identical shape. Hence, even if the widened portions move towards the other side in the tire circumferential direction when wear progresses, the widened portions continuously maintain a staggered arrangement when the land portion is viewed as a whole, so that the drainage performance can be further improved, and the balance of rigidity of land portions can be optimized, even when wear progresses.

The tire circumferential direction positions of the widened portions adjacent in the tire width direction can, however, be aligned.

The present disclosure is not particularly limited but is suitably used as a pneumatic tire for trucks and buses. The present disclosure is not limited in any way to the above example. For example, the widened portion has a curved cylindrical shape in the above example, but the widened portion can have a variety of cross-sectional shapes, such as polygonal shapes. Not all of the widened portions need have the same shape, for example, and sets of two or three different sizes or types of shapes can be arranged in the tire circumferential direction. Various other modifications and changes may be made.

REFERENCE SIGNS LIST

1 Tread surface
2, 2a, 2b Circumferential main groove
3, 3a, 3b, 3c Land portion
4 Circumferential sipe
4a Widened portion
CL Tire equatorial plane
TE Tread edge

The invention claimed is:

1. A pneumatic tire comprising, on a tread surface, a plurality of circumferential main grooves extending in a tire circumferential direction, and a plurality of land portions defined between circumferential main grooves adjacent in a tire width direction among the plurality of circumferential main grooves or by the circumferential main grooves and tread edges, wherein
the land portions include at least one circumferential sipe extending in the tire circumferential direction,
the circumferential sipe includes a plurality of widened portions, having a sipe width larger than in other portions, arranged in the tire circumferential direction,
in a case in which a circumferential main groove is located on a tire equatorial plane, two land portions defined by the circumferential main groove located on the tire equatorial plane are designated as center land portions, in a case in which a land portion is located on the tire equatorial plane, the land portion is designated as a center land portion, land portions adjacent to the tread edges are designated as shoulder land portions, and each land portion other than the center land portion and the shoulder land portions is designated as an intermediate land portion, and
in a reference state such that the pneumatic tire is mounted on an applicable rim, filled to a prescribed internal pressure, and under no load,
each widened portion is formed only from a portion that, from one side towards another side in the tire circumferential direction, extends from the tread surface inward in a tire radial direction,
a tire radial area from a sipe bottom of the circumferential sipe to $1/3$ of a sipe depth of the circumferential sipe is designated as a sipe bottom area, and
an average inclination angle of the widened portion relative to a normal direction of the tread surface at the sipe bottom area in the center land portion is larger than an average inclination angle of the widened portion relative to the normal direction of the tread surface in the intermediate land portion.

2. The pneumatic tire of claim 1, wherein in the reference state, the widened portion includes a portion in which an inclination angle relative to a normal direction of the tread surface increases from outside to inside in the tire radial direction.

3. The pneumatic tire of claim 2, wherein
the circumferential sipe having the widened portions is provided at least in the center land portion.

4. The pneumatic tire of claim 2, wherein
in the reference state,
the sipe width of the widened portion at the sipe bottom area in the center land portion is larger than the sipe width of the widened portion at the sipe bottom area in the intermediate land portion.

5. The pneumatic tire of claim 2, wherein
a tire rotation direction is specified, and
one side in the tire circumferential direction is a stepping-in side.

6. The pneumatic tire of claim 1, wherein the widened portion includes a portion in which the sipe width increases from outside to inside in the tire radial direction.

7. The pneumatic tire of claim 6, wherein
the circumferential sipe having the widened portions is provided at least in the center land portion.

8. The pneumatic tire of claim 6, wherein
in the reference state,
the sipe width of the widened portion at the sipe bottom area in the center land portion is larger than the sipe width of the widened portion at the sipe bottom area in the intermediate land portion.

9. The pneumatic tire of claim 6, wherein
a tire rotation direction is specified, and
one side in the tire circumferential direction is a stepping-in side.

10. The pneumatic tire of claim 1, wherein
the circumferential sipe having the widened portions is provided at least in the center land portion.

11. The pneumatic tire of claim 10, wherein
in the reference state,
the sipe width of the widened portion at the sipe bottom area in the center land portion is larger than the sipe width of the widened portion at the sipe bottom area in the intermediate land portion.

12. The pneumatic tire of claim 1, wherein
in the reference state,
the sipe width of the widened portion at the sipe bottom area in the center land portion is larger than the sipe width of the widened portion at the sipe bottom area in the intermediate land portion.

13. The pneumatic tire of claim 1, wherein
a tire rotation direction is specified, and
one side in the tire circumferential direction is a stepping-in side.

14. The pneumatic tire of claim 1, wherein
the at least one circumferential sipe includes a plurality of circumferential sipes in one land portion, the widened portions of two circumferential sipes adjacent in the tire width direction among the plurality of circumferential sipes are provided at positions shifted from each other in the tire circumferential direction when the tread surface is viewed while the pneumatic tire is new, and the widened portions of the plurality of circumferential sipes are identical to each other in shape.

15. A pneumatic tire comprising, on a tread surface, a plurality of circumferential main grooves extending in a tire circumferential direction, and a plurality of land portions defined between circumferential main grooves adjacent in a tire width direction among the plurality of circumferential main grooves or by the circumferential main grooves and tread edges, wherein the land portions include at least one circumferential sipe extending in the tire circumferential direction, the circumferential sipe includes a plurality of widened portions, having a sipe width larger than in other portions, arranged in the tire circumferential direction, in a case in which a circumferential main groove is located on a tire equatorial plane, two land portions defined by the circumferential main groove located on the tire equatorial plane are designated as center land portions, in a case in which a land portion is located on the tire equatorial plane, the land portion is designated as a center land portion, land portions adjacent to the tread edges are designated as shoulder land portions, and each land portion other than the center land portion and the shoulder land portions is designated as an intermediate land portion, and in a reference state such that the pneumatic tire is mounted on an applicable rim, filled to a prescribed internal pressure, and under no load, each widened portion is formed only from a portion that, from one side towards another side in the tire circumferential direction, extends from the tread surface inward in a tire radial direction, a tire radial area from a sipe bottom of the circumferential sipe to ⅓ of a sipe depth of the circumferential sipe is designated as a sipe bottom area, and the sipe width of the widened portion at the sipe bottom area in the center land portion is larger than the sipe width of the widened portion at the sipe bottom area in the intermediate land portion.

16. The pneumatic tire of claim 15, wherein in the reference state, the widened portion includes a portion in which an inclination angle relative to a normal direction of the tread surface increases from outside to inside in the tire radial direction.

17. The pneumatic tire of claim 15, wherein the widened portion includes a portion in which the sipe width increases from outside to inside in the tire radial direction.

18. The pneumatic tire of claim 15, wherein
the circumferential sipe having the widened portions is provided at least in the center land portion.

19. The pneumatic tire of claim 15, wherein
a tire rotation direction is specified, and
one side in the tire circumferential direction is a stepping-in side.

20. The pneumatic tire of claim 15, wherein
the at least one circumferential sipe includes a plurality of circumferential sipes in one land portion,
the widened portions of two circumferential sipes adjacent in the tire width direction among the plurality of circumferential sipes are provided at positions shifted from each other in the tire circumferential direction when the tread surface is viewed while the pneumatic tire is new, and
the widened portions of the plurality of circumferential sipes are identical to each other in shape.

* * * * *